United States Patent [19]
Ota

[11] Patent Number: 5,487,122
[45] Date of Patent: Jan. 23, 1996

[54] STAR COUPLER INCLUDING WAVEGUIDES HAVING DIFFERENT RADIUS OF CURVATURES

[75] Inventor: Takeshi Ota, Kanagawa, Japan

[73] Assignee: Fuji Xerox Co., Ltd., Tokyo, Japan

[21] Appl. No.: 15,161

[22] Filed: Feb. 9, 1993

[30] Foreign Application Priority Data

Feb. 12, 1992 [JP] Japan ................................. 4-025407

[51] Int. Cl.$^6$ ................................................. G02B 6/28
[52] U.S. Cl. ............................... 385/46; 385/28; 385/44; 385/45
[58] Field of Search .............................. 385/46, 45, 50, 385/39, 44, 14, 27, 28, 24, 47, 48

[56] References Cited

U.S. PATENT DOCUMENTS

| | | | |
|---|---|---|---|
| 4,760,580 | 7/1988 | Thompson et al. | 385/45 |
| 4,989,937 | 2/1991 | Mahlein et al. | 385/39 |
| 5,093,876 | 3/1992 | Henry et al. | 385/45 |
| 5,109,448 | 4/1992 | Coden et al. | 385/46 |
| 5,282,257 | 1/1994 | Ota | 385/46 |
| 5,343,545 | 8/1994 | Ota et al. | 385/46 |

OTHER PUBLICATIONS

"Fibernet: Multimode Optical Fibers for Local Computer Networks", E. G. Rawson et al., IEEE Transactions on Communications, vol. COM–26, No. 7, pp. 983–990, (1978) (no month).

Primary Examiner—John D. Lee
Assistant Examiner—Hemang Sanghovi
Attorney, Agent, or Firm—Finnegan, Henderson, Farabow, Garrett & Dunner

[57] ABSTRACT

A first terminal is connected to a second terminal by means of a first waveguide having a first radius of curvature. The first terminal (or second terminal) is connected to a third terminal by means of a second waveguide (or a third waveguide) having a second radius of curvature which is grater than the first radius of curvature. Incident light supplied from the first terminal is branched between the first waveguide and the second waveguide, and the light entering the first waveguide undergoes the greater attenuation since this waveguide has the smaller radius of curvature. Hence, the light component passing through the first waveguide has a difference in output from the component passing through the second waveguide that is sufficiently great to provide a large branching ratio.

12 Claims, 6 Drawing Sheets

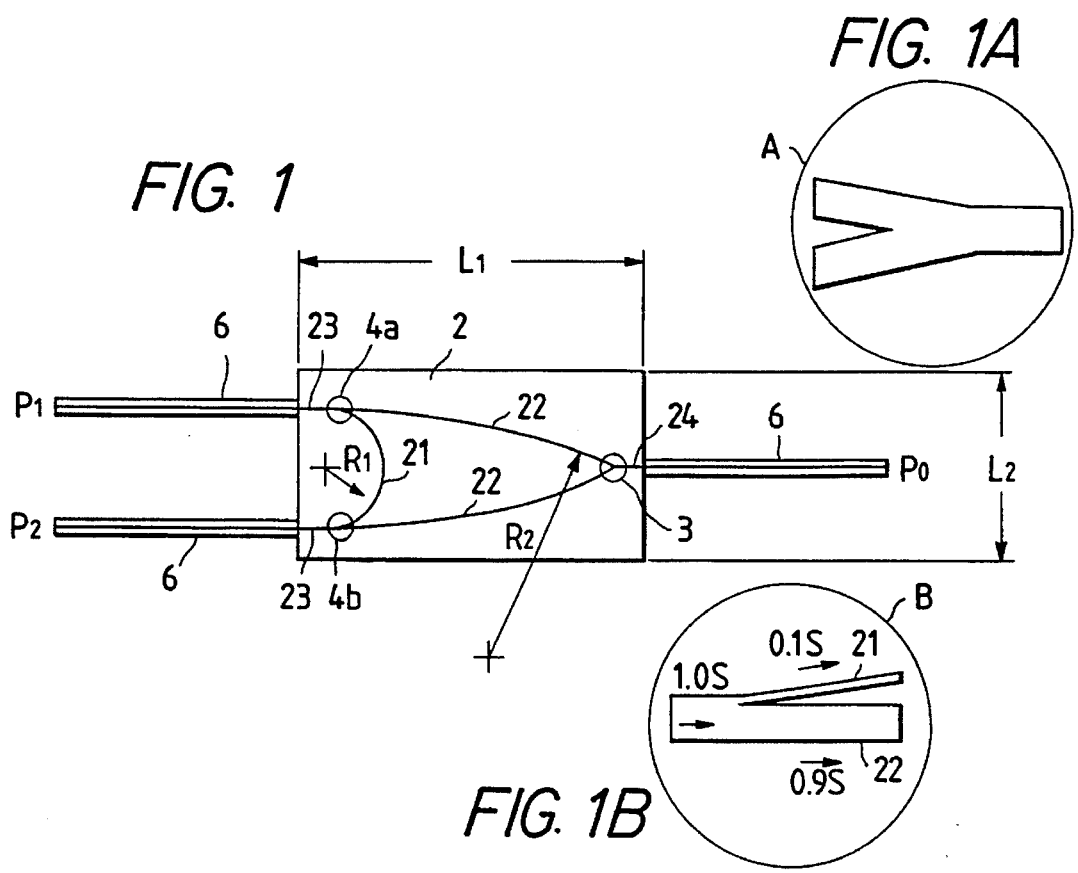
FIG. 1
FIG. 1A
FIG. 1B
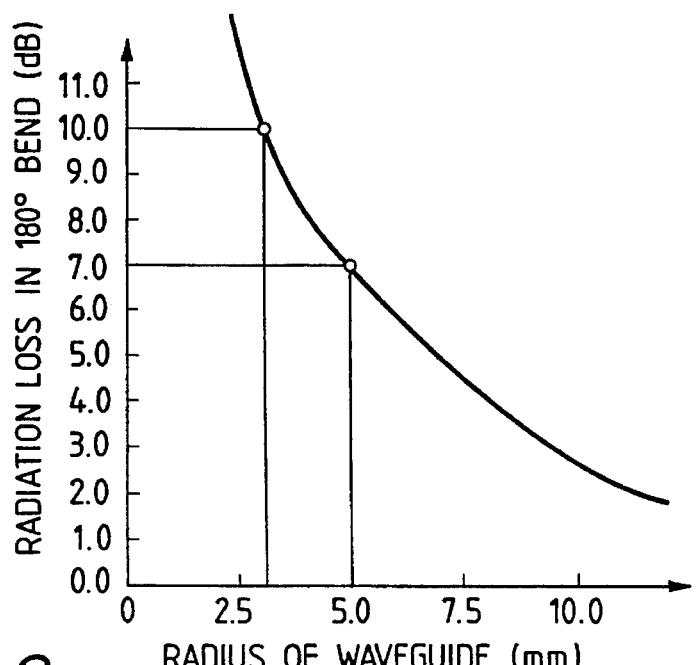
FIG. 2

STAR COUPLER INCLUDING WAVEGUIDES HAVING DIFFERENT RADIUS OF CURVATURES

BACKGROUND OF THE INVENTION

This invention relates to a star coupler using unequal optical signal distributing devices.

A plurality of nodes are interconnected via star couplers in a fiber optics transmission network. For detailed information on star couplers, see, for example, E. G. Rawson et all., IEEE Transactions on Communications, Vol. COM-26, No. 7, July 1978, pp. 983–990, "Fibernet: Multimode Optical Fibers for Local Computer Networks".

FIG. 4 shows an exemplary layout of a star coupler proposed by the applicant. The star coupler has a single unit of 1×2 equal optical distributor 3, four units of 1×2 unequal optical distributor 4 and two units of 2×2 unequal optical distributor 5 formed on a substrate 2. The respective components are interconnected via waveguides 11– 18. Five optical fibers 6 are connected to the substrate 2 and an optical signal 1 is supplied to and delivered from the star coupler via these optical fibers 6. Shown by R in FIG. 4 is the radius of curvature of each waveguide. The numerals put before the terms "distributor" denote the numbers of optical paths provided at opposite ends of each component; for instance, "1×2" signifies the provision of one optical path at one end and two optical paths at the other end.

FIG. 5 shows an exemplary layout of the 1×2 unequal optical distributor 4. The waveguide 11 before branching has a width $W_1$ and light is branched between waveguides 12 and 13 having different widths $W_2$ and $W_3$, respectively. The widths $W_2$ and $W_3$ are set at such values that the required distribution ratio will be attained. For instance, in order to achieve a branching ratio of 1:2, the widths $W_1$, $W_2$ and $W_3$ should be set 40 μm, 13 μm and 27 μm, respectively.

FIG. 6 shows an exemplary layout of the 2×2 unequal optical distributor 5 that is composed of a 1×2 equal optical distributor 9 and a 1×2 unequal optical distributor 10. Two waveguides 14a and 14b at one end are designed to have the same width $W_4$ whereas two waveguides 15 and 16 at the other end are designed to have different widths $W_5$ and $W_6$.

FIG. 7 shows an exemplary layout of the 1×2 equal optical distributor 3. Waveguides 17a and 17b between which light is to be branched have the same width. Shown by reference numeral 18 is a waveguide before branching.

Referring to the star coupler shown in FIG. 4, the optical signal 1 supplied from terminal $P_1$ via optical fiber 6 passes through the two units of 1×2 unequal optical distributor 4 to have part of it distributed to terminal $P_2$. Thereafter, the signal passes through the 2×2 unequal optical distributors 5 to have part of it distributed to terminals $P_3$ and $P_4$. The remaining part of the signal is transmitted to terminal $P_0$ via the 1×2 equal optical distributor 3. Symbol "$x_n$" in FIG. 4 denotes the light component to be supplied to the star coupler and "$y_n$" denotes the component to be delivered from the coupler.

As shown in FIG. 8, when signal S is supplied to the terminal $P_1$ of the star coupler shown in FIG. 4, signal component bS is distributed to a specified terminal $P_0$ whereas signal components aS are distributed to the other three terminals $P_2$, $P_3$ and $P_4$. No part of the signal is distributed to the terminal $P_1$ itself. Symbols a and b denote coefficients of distribution and bS>aS>0. When signal S is supplied to terminal $P_2$, $P_3$ or $P_4$, the signal is distributed under the same fashion.

As shown in FIG. 9, when input signal S is supplied to the specified terminal $P_0$, the signal is distributed equally among the four terminals $P_1$, $P_2$, $P_3$ and $P_4$ but no part of the signal is distributed to the terminal $P_0$ per se.

The relationships of signal distribution in FIGS. 8 and 9 may be expressed by a matrix as follows:

$$\begin{bmatrix} y_0 \\ y_1 \\ y_2 \\ y_3 \\ y_4 \end{bmatrix} = \begin{bmatrix} 0 & b & b & b & b \\ 1/4 & 0 & a & a & a \\ 1/4 & a & 0 & a & a \\ 1/4 & a & a & 0 & a \\ 1/4 & a & a & a & 0 \end{bmatrix} \begin{bmatrix} x_0 \\ x_1 \\ x_2 \\ x_3 \\ x_4 \end{bmatrix} \quad (1)$$

where $x_0$, $x_1$, $x_2$, $x_3$ and $x_4$ are input signals to the terminals $P_0$, $P_1$, $P_2$, $P_3$ and $P_4$, respectively, whereas $y_0$, $y_1$, $y_2$, $y_3$ and $y_4$ are output signals from those terminals.

A star coupler of the type described above in which all elements on the main diagonal (i=j) of the transfer matrix are zero but not all of the other elements are equal is designated hereinafter as a "half coupler". A fiber optics communication network is composed by combining the above-described half coupler with a "full coupler", in which all elements on the main diagonal of the transfer matrix are zero and all other elements are approximately of equal values. In the following description, the number of terminals in a half coupler shall be expressed in terms of the number of all terminals except a specified terminal whereas the number of terminals in a full coupler shall be expressed in terms of the total number of terminals present.

FIG. 10 shows a network comprising two 4-terminal half couplers HC1 and HC2, and a single 4-terminal full coupler FC. Input signal S to one terminal $P_{1a}$ of half coupler HC1 is distributed in such a way that bS accounting for greater part of the signal power is sent to a specified terminal $P_{0a}$, with the remaining signal components being sent to the other terminals $P_{2a}$, $P_{3a}$ and $P_{4a}$. Since terminal $P_{0a}$ is connected to a terminal of full coupler FC, a signal equal to (⅓)bS is distributed to the other three terminals of that full coupler FC as shown in FIG. 10.

Another terminal of full coupler FC is connected to a specified terminal $P_{0b}$ of the other half coupler HC2. From this terminal, signal aS equal to ¼×(⅓)bS=bS/12 is distributed to each of the other terminals $P_{1b}$, $P_{2b}$, $P_{3b}$ and $P_{4b}$ of the half coupler HC2. If a=b/12, the ratio of signal distribution among the terminals $P_{2a}$, $P_{3a}$ and $P_{4a}$ can be made equal to the ratio of signal distribution among the terminals $P_{1b}$, $P_{2b}$, $P_{3b}$ and $P_{4b}$.

For the technical rationale of combining half couplers with full couplers, the major feature is that with the ratio of signal distribution by a star coupler being designed appropriately, star couplers with a smaller number of terminals can be combined to realize the construction of a large-size network in a simple manner.

In the foregoing description, it has been assumed that the loss of optical signal is negligible. In practice, however, the transmission loss of optical fibers, the connection loss of connectors and the excessive loss of individual couplers are by no means negligible. The total insertion loss is the excessive loss added to the attenuation (insertion loss) caused for attaining the intended branching ratio.

FIG. 11 schematically shows an actual system that implements the network shown in FIG. 10. Node $N_{1a}$ in FIG. 11 corresponds to terminal $P_{1a}$ in FIG. 10, and node $N_{1b}$ in FIG. 11 corresponds to terminal $P_{1b}$ in FIG. 10. Node $N_{1a}$, half coupler HC1, full coupler FC, half coupler HC2 and node $N_{1b}$ are interconnected via optical connectors $PC_1$ to $PC_8$ and optical fibers 6 extending for a total distance of 1 km.

Suppose here that the network implemented with the system shown in FIG. 11 suffers a transmission loss of −2 dB/km the optical fibers 6, a connection loss of −0.2 dB per site of optical connectors $PC_1$ to $PC_8$, and an excessive loss of −2 dB in each coupler. FIG. 12 is a level diagram of signal light as it travels from terminal $P_{1a}$ (corresponding to the transmission port of node $N_{1a}$) to terminal $P_{1b}$ (corresponding to the transmission port of node $N_{1b}$). With the light intensity of transmission output being normalized as zero dB, an attenuation of −3.6 dB (=−1 d− 2 dB−0.2 dB×3: loss $B_1$ occurring in zone $A_1$) occurs in half coupler HC1 and in three optical connectors $PC_1$, $PC_2$ and $PC_3$, then an attenuation of −8.4 dB (=−4 dB−2 dB− 0.2 dB×2−2 dB: loss $B_2$ occurring in zone $A_2$) occurs in full coupler FC, two optical connectors $PC_4$ and $PC_5$, and in the 1-km optical fibers 6, and a further attenuation of − 8.4 dB (=−5.8 dB−2 dB−0.2 dB×3: loss $B_3$ occurring in zone $A_3$) occurs in half coupler HC2 and in three optical connectors $PC_6$, $PC_7$ and $PC_8$. Thus, signal S being supplied to terminal $P_{1a}$ or half coupler HC1 leaves half coupler HC2 at each of the terminals $P_{1b}$, $P_{2b}$, $P_{3b}$ and $P_{4b}$ as signal aS that has decayed to −20.4 dB less than the initial signal. It should be noted that the −1 dB drop occurring in half coupler HC1, the −4 dB drop occurring in full coupler FC and the −5.8 dB drop occurring in half coupler HC2 are the amounts of ideal attenuation that should take place in the respective portions. Since the signal distributed to each of the terminals $P_{2a}$, $P_{3a}$ and $P_{4a}$ of half coupler HC1 must have the same optical level as signal aS delivered from each of the terminals $P_{1b}$, $P_{2b}$, $P_{3b}$ and $P_{4b}$ of half coupler HC2, coefficient a of signal distribution by half coupler HC1 must be desired in such a way that signal S supplied to terminal $P_{1a}$ of half coupler HC1 decays by −20.4 dB before it is delivered to terminals $P_{2a}$, $P_{3a}$ and $P_{4a}$ of the same half coupler HC1. For the sake of simplicity, let assume that signal S is attenuated by −20 dB; it then follows that the distribution coefficient a must be 1/100, namely the branching ratio must be 100:1.

As already described with reference to FIGS. 5 and 6, the unequal branching device which is designed to provide a predetermined branching ratio by adjusting the ratio between the widths of waveguides; however, this involves difficulty in attaining a very large branching ratio. Consider, for example, the case of achieving an attenuation of −20 dB; to this end, the ratio between the widths of waveguides must be adjusted to 100:1 but this means that the wider waveguide has a width of about 40 μm whereas the narrower one has a width of about 0.4 μm. As a matter of fact, fabricating such an extremely fine waveguide is very difficult from the viewpoint of manufacturing technology. Furthermore, such waveguide whose width is narrower than the wavelength of signal light can not guide the light any longer.

If structural constraints require that waveguides be curved, the general practice is to increase the radius of curvature as much as possible in order to suppress the radiation loss that would otherwise occur on account of the curvature of the waveguides. This has made it necessary to use substrate of a larger area for providing waveguides, inevitable leading to bulky equipment.

Furthermore, the four-terminal half coupler shown in FIG. 4 has the optical fiber 6 connected to each of the four end facets of the substrate 2; hence, in order to achieve optical coupling between the substrate 2 and each optical fiber 6, the four end faces of the substrate 2 have to be polished, thus increasing the time required to complete the fabrication process.

SUMMARY OF THE INVENTION

The present invention has been accomplished under these circumstances and has as an object providing a star coupler that is capable of branching light at high ratio.

Another object of the present invention is to provide a star coupler that can be fabricated on a small substrate.

Still another object of the present invention is to provide a star coupler in which the number of the polished end facets of a substrate is sufficiently reduced to realize easy fabrication of the assembly.

To attain the above objects, the invention provides a star coupler including a first, a second and a third waveguides, the second and third waveguides branching from the first waveguide and having different radii of curvature.

Also, the invention provides a star coupler including a first, a second and a third waveguides, the first waveguide having a first radius of curvature and connecting between a first and a second terminals, and the second and third waveguides having a second radius of curvature greater than the first radius of curvature and connecting respectively between the first terminal and a third terminal and between the second terminal and the third terminal.

BRIEF DESCRIPTION OF THE DRAWINGS

FIG. 1 is a schematic diagram showing a two-terminal half coupler according to an embodiment of the present invention;

FIG. 2 is a graph showing the relationship between the radius of curvature of a waveguide and the radiation loss that occurs in the waveguide;

DETAILED DESCRIPTION OF THE PREFERRED EMBODIMENTS

Figure 3:
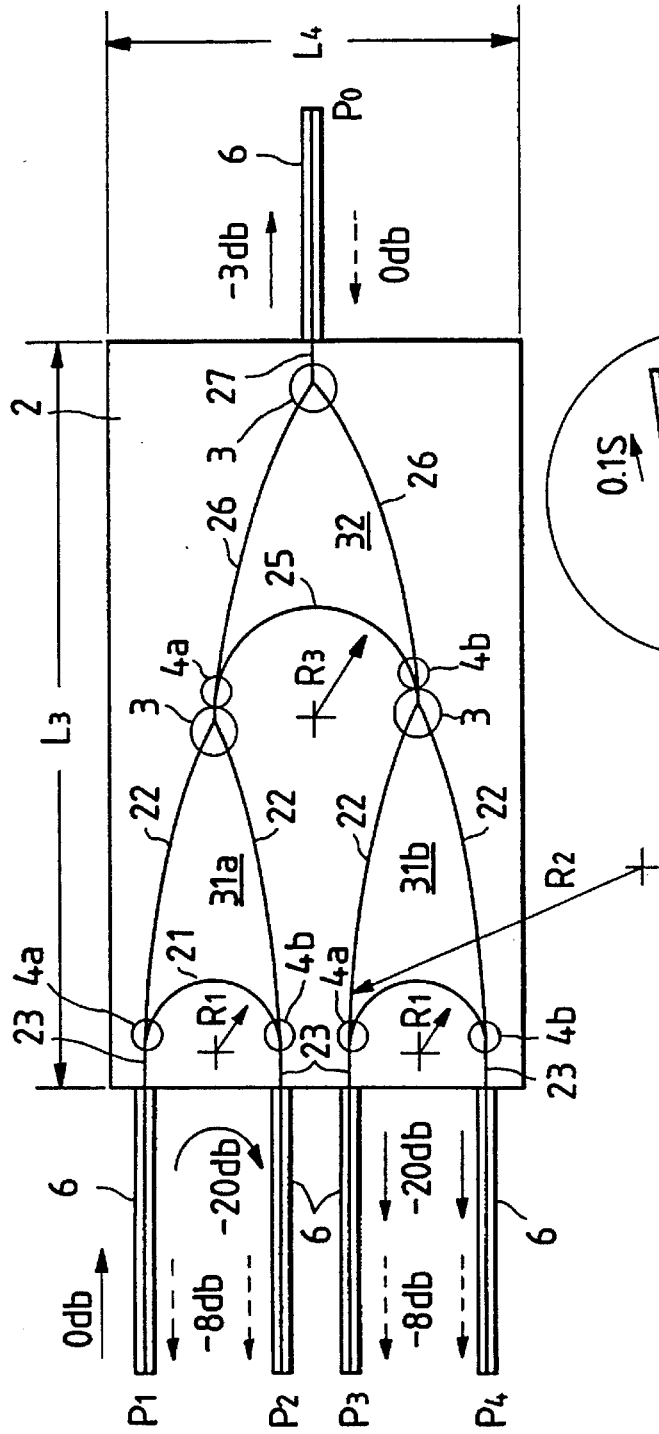
FIG. 3 is a schematic diagram showing a four-terminal half coupler according to another embodiment of the present invention.

The characteristic features of the present invention are hereunder described in detail with reference to the embodiments shown in accompanying drawings.

FIG. 1 is a schematic diagram showing a two-terminal half coupler that is implemented as an optical integrated circuit according to an embodiment of the present invention. The term "two-terminal" as used herein means the number of terminals except the specified one which is mentioned in connection with the description of the background of the invention. The half coupler shown in FIG. 1 has a single unit of 1×2 equal optical distributor 3 and two units of 1×2 unequal optical distributor 4a and 4b formed on a substrate 2. As shown in enlarged size in circle A, the 1×2 equal optical distributor 3 is branched out into two waveguides of the same width. Further, as shown in enlarged size in circle B, the 1×2 unequal optical distributor 4b (and 4b, too) is branched out into two waveguides of different widths.

The three units of distributor 3, 4a and 4b are arranged in the form of an isosceles on the rectangular substrate 2, with the 1×2 equal optical distributor 3 lying at the point of intersection of the two equal sides. The rectangular substrate 2 may be of such a size that length $L_1$ is 10 mm whereas width $L_2$ is 5 mm.

Formed between the two units of 1×2 unequal optical distributor 4a and 4b is a semicircular waveguide 21 having a curvature radius of $R_1$, with the center being positioned at a point substantially intermediate between the two units of distributor 4a and 4b. The value of $R_1$ may be 3 mm. Formed between the distributor 3 and each of the units of distributor 4a and 4b is an arcuate waveguide 22 having a curvature radius of $R_2$, with the center lying at a point outside the substrate 2. The value of $R_2$ may be 30 mm. Waveguides 23 are drawn out of the two units of 1×2 unequal optical distributor 4a and 4b and they extend to an end of the substrate, where they are coupled to optical fibers 6. A waveguide 24 is drawn out of the 1×2 equal optical distributor 3 and it extends to the other end of the substrate, where it is coupled to an optical fiber 6. The two units of 1×2 unequal optical distributor 4a and 4b are so designed that each is branched out into two waveguides 21 and 22 whose width ratio is selected at about 1:9.

When the half coupler shown in FIG. 1 is supplied with an optical signal from terminal $P_1$ via optical fiber 6, the input light is distributed to the ratio 9:1 in the 1×2 unequal optical distributor 4a and 9/10 of the light is introduced to the waveguide 22, where it decays by about −0.5 dB whereas 1/10 of the light is introduced to the waveguide 21, where it decays by −10 dB. The light component introduced to the waveguide 21 passes through it to be supplied to the other 1×2 unequal optical distributor 4b. In the embodiment under consideration, the waveguide 21 is bent with the comparatively small curvature radius $R_1$ and, hence, considerable radiation loss will occur. This is clear from FIG. 2, which shows that the radiation loss against curvature of waveguide. In the case of waveguide 21, the radius of curvature is 3 mm and, hence, the radiation loss that occurs is −10 dB. It should be noted here that the graph shown in FIG. 2 refers to the radiation loss that occurs when the waveguide is bent through 180 degrees; hence, if one takes into account the radiation loss that occurs in waveguide 21, the 1×2 unequal optical distributor 4a will cause a loss of −20 dB in the light component travelling through the waveguide 21. In other words, the light supplied from terminal $P_1$ will be adequately attenuated by −20 dB before it is delivered to terminal $P_2$.

The light component introduced to the waveguide 22 passes through it to be supplied to the 1×2 equal optical distributor 3. The curvature radius $R_2$ of waveguide 22 is 30 mm and, hence, as one can estimate from FIG. 2, the radiation loss occurring in the waveguide 22 can be regarded as substantially equal to 0 dB. Therefore, the light supplied from terminal $P_1$ decays by about −0.5 dB before it is delivered to the specified terminal $P_0$.

As described above, the 1×2 unequal optical distributor 4 distributes light to a ratio of about 1:9 and, hence, the waveguides to be incorporated in that device can be constructed easily. Furthermore, reducing the radii of curvature of waveguides presents no particular technological difficulty in fabricating an optical integrated circuit. What is more, reducing the radii of curvature of waveguides is effective in reducing the area of the substrate on which the waveguides are to be arranged, thereby contributing to the production of a smaller system. Another advantage that results from reducing the radii of curvature of waveguides is that the optical fiber 6 and the substrate 2 can be arranged in such a way that they contact only on the two shorter sides of the rectangular substrate; as a consequence, the number of end faces of the substrate that need be polished can be reduced to two, thereby contributing to easy fabrication of the half coupler.

While the two-terminal half coupler has been described on the foregoing pages, it should be noted that a four-terminal half coupler can be constructed in a similar way. FIG. 3 is a schematic diagram showing a four-terminal half coupler according to another embodiment of the present invention; in FIG. 3, the members and components that correspond to those used in the embodiment shown in FIG. 1 are identified by like numerals.

The four-terminal half coupler shown in FIG. 3 has two optical circuits 31a and 31b arranged in parallel on the left side of the rectangular substrate 2; like the two-terminal half coupler shown in FIG. 1, each optical circuit is composed of a single unit of 1×2 equal optical distributor 3, two units of 1×2 unequal optical distributor 4a and 4b, a waveguide 21 connecting the two units of 1×2 unequal optical distributor 4a and 4b, and waveguides 22 connecting between the 1×2 equal optical distributor 3 and the respective units of 1×2 unequal optical distributor 4. The rectangular substrate 2 may be of such a size that length $L_3$ is 20 mm whereas width $L_4$ is 10 mm. Waveguides 23 are drawn out of each optical circuit 31 and they extend to one of the two shorter sides of the substrate 2, where they are coupled to optical fibers 6.

The waveguide on the common side of the 1×2 equal optical distributor 3 in optical circuit 31a (or 31b) is connected to 1×2 unequal optical distributor 4a (or 4b) in an optical circuit 32 having the same construction as the optical circuit 31a (and 31b), except that a waveguide 25 provided between two units of 1×2 unequal optical distributor 4a and 4b has a radius of curvature $R_3$ which is greater than $R_1$ but smaller than $R_2$. The value of $R_3$ may be 5 mm. A waveguide 26 is provided between the 1×2 unequal optical distributor 4a (or 4b) and the 1×2 equal optical distributor 3. A waveguide 27 is drawn out of the 1×2 equal optical distributor 3 in the optical circuit 32 and extends to the other shorter side of the rectangular substrate 2, where it is coupled to an optical fiber 6 that is associated with a specified terminal $P_0$.

When the four-terminal half coupler shown in FIG. 3 is supplied with an optical signal from terminal $P_1$ via optical fiber 6, the input light is distributed to a ratio of 9:1 in the 1×2 unequal optical distributor 4a in the optical circuit 31a and 9/10 of the light is introduced to the waveguide 22, where it decays by about −0.5 dB whereas 1/10 of the light is introduced to the waveguide 21, where it decays by −10 dB. The light component introduced to the waveguide 21 which is curved with radius $R_1$ (=3 mm) passes through it to be supplied to the other 1×2 unequal optical distributor 4b in the optical circuit 31a. Hence, as in the case of the two-terminal half coupler shown in FIG. 1, the light supplied form terminal $P_1$ is attenuated by −20 dB before it is delivered to terminal $P_2$.

On the other hand, the light component introduced to the waveguide 22 which is curved with radius $R_2$ (=30 mm)

passes through it but there occurs little attenuation in the light before it is supplied to the 1×2 equal optical distributor 3. Hence, the light supplied from terminal $P_1$ decays by about −0.5 dB before it is supplied to the 1×2 unequal optical distributor 4a in the optical circuit 32. In the distributor 4a, the input light is distributed to the ratio 9:1 and the light component introduced to the waveguide 26 which is curved with radius $R_2$ (=30 mm) decays by about −0.5 dB as it passes through the waveguide 26, it is subsequently supplied to the 1×2 equal optical distributor 3. Thus, the light supplied from terminal $P_1$ decays by −1 dB before it is delivered to the specified terminal $P_0$.

In the 1×2 unequal optical distributor 4a in the optical circuit 32, the light component distributed to the waveguide 25 which is curved with radius $R_3$ (=5 mm) passes through it, decaying by −10 dB before it is supplied to the other 1×2 unequal optical distributor 4b in the optical circuit 32. As it is shown in FIG. 2, a radiation loss of −17 dB occurs when $R_3$ is 5 mm and, hence, the light that has passed through the waveguide 25 is decayed to about −17.5 dB less than the incoming light. The light coming from the 1×2 unequal optical distributor 4b is distributed to a ratio of 1:1 in the 1×2 equal optical distributor 3 in the optical circuit 31b, where it decays by about −3 dB. Hence, the light supplied from terminal $P_1$ is attenuated by about −20 dB before it is delivered to terminals $P_3$ and $P_4$.

Conversely, if an optical signal is supplied at the specified terminal $P_0$, the input light is distributed to a ratio of 1:1 in the 1×2 equal optical distributor 3 in the optical circuit 32, decaying about −3 dB. The distributed light components pass through the two waveguides 26 curved with radius $R_2$ (=30 mm) and they are subsequently supplied to the respective units of 1×2 unequal optical distributor 4a and 4b. The light components coming from the respective units of 1×2 unequal optical distributor 4a and 4b are supplied to the corresponding units of 1×2 equal optical distributor 3 in the two optical circuits 31a and 31b, where they are distributed to a ratio of 1:1, decaying by about −3 dB. Hence, the light supplied from the specified terminal $P_0$ is attenuated by about −6 dB before it is delivered to respective terminals $P_1$ to $P_4$.

Figure 4:
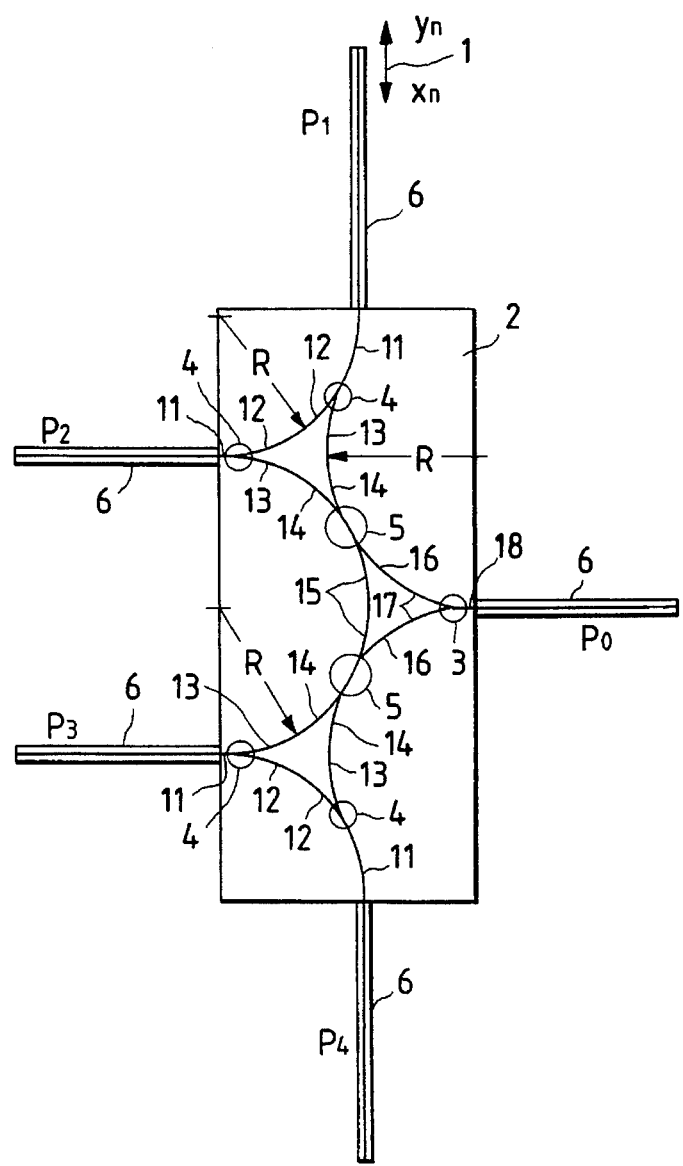
FIG. 4 is a plan view of an optical integrated circuit comprising a four-terminal half coupler formed on a substrate.
Figure 5:
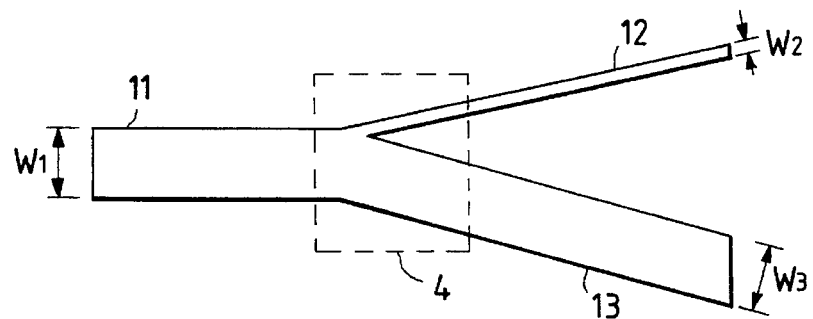
FIG. 5 is a plan view of a 1×2 unequal optical distributor.
Figure 6:
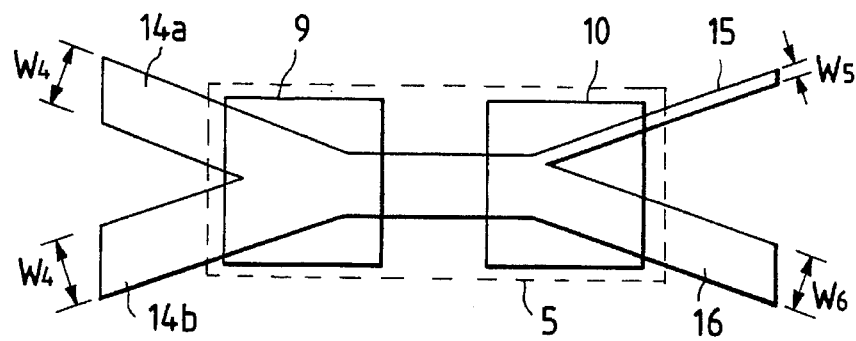
FIG. 6 is a plan view of a 2×2 unequal optical distributor.
Figure 7:
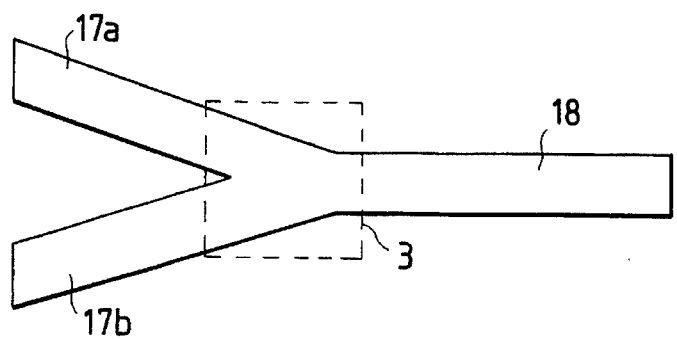
FIG. 7 is a plan view of a 1×2 equal optical distributor.
Figure 8:
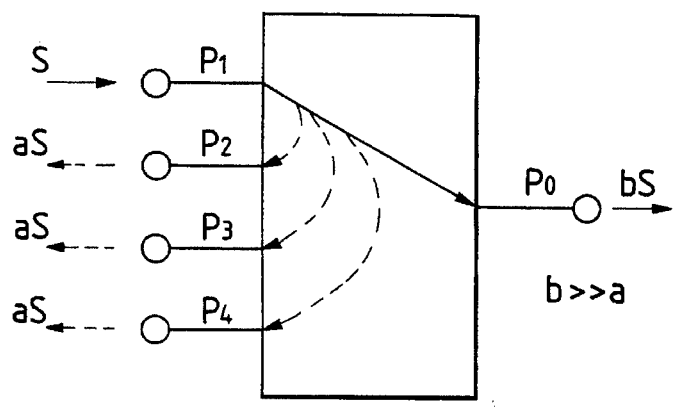
FIG. 8 is a diagram showing the concept of distribution of an input signal as supplied to all but one, specified terminal of the four-terminal half coupler shown in FIG. 4.
Figure 9:
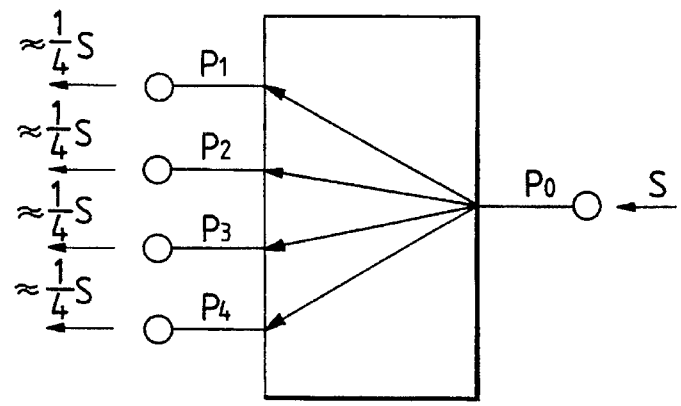
FIG. 9 is a diagram showing the concept of distribution of an input signal as supplied to a specified terminal of the four-terminal half coupler shown in FIG. 4.
Figure 10:
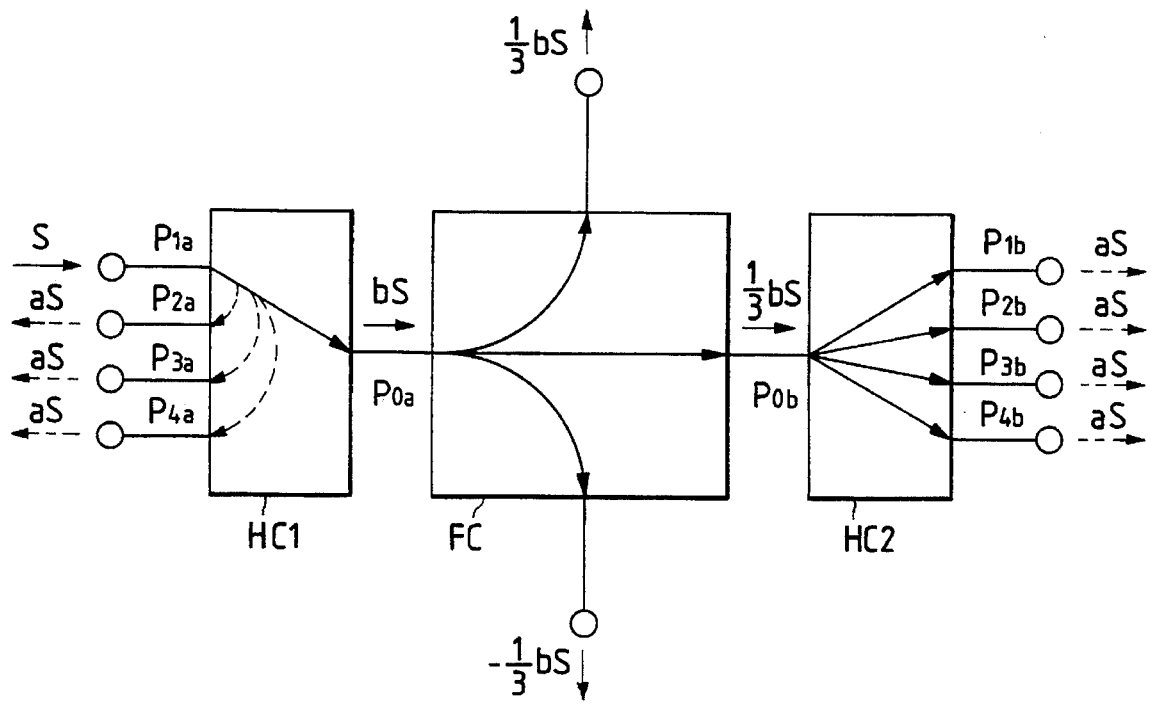
FIG. 10 is a diagram showing the concept of signal distribution in a network constructed by connecting two 4-terminal half couplers with a 4-terminal full coupler.
Figure 11:
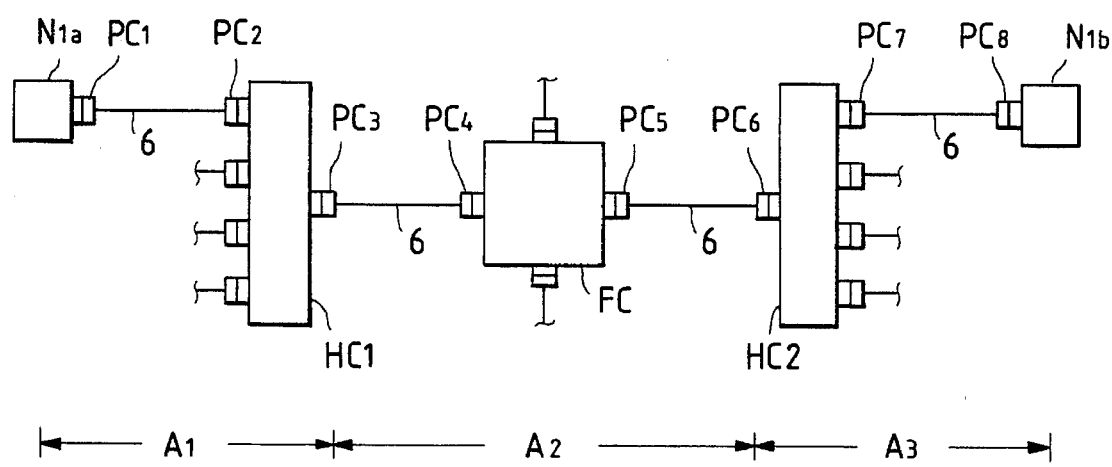
FIG. 11 is an illustration of an actual system that implements the network shown in FIG. 10.
Figure 12:
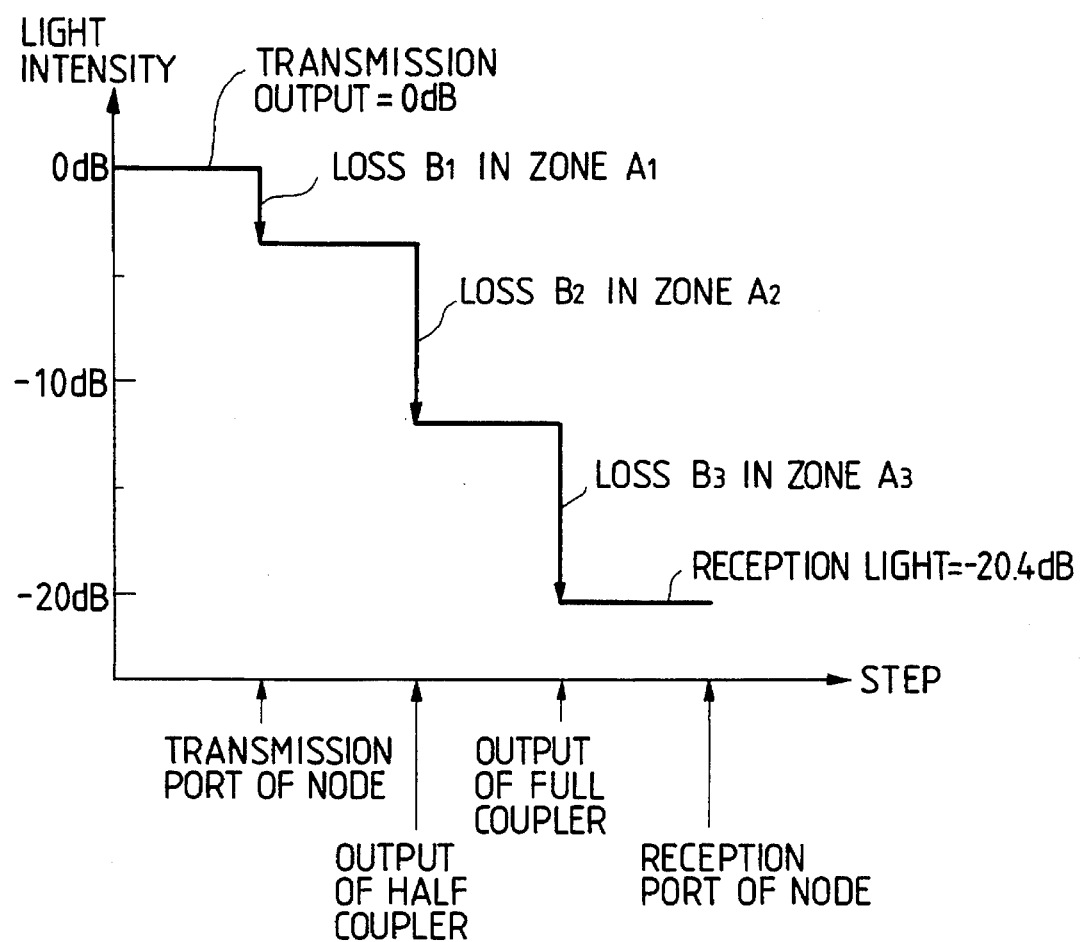
FIG. 12 is a level diagram showing how an optical signal decays in,the network implemented with the system shown in FIG. 11.

As in the two-terminal half coupler shown in FIG. 1, the four-terminal half coupler shown in FIG. 3 and which has been described hereinabove provides the predetermined attenuation (namely, distribution ratio) by reducing the radii of curvature of waveguides; hence, the four-terminal half coupler can be implemented as an optical integrated circuit on a small substrate area only about 10 mm by 20 mm. When adopting the proposed composition shown in FIG. 4, the waveguides have to be curbed with radii not smaller than about 10 mm, making it necessary to use a large substrate area about 40 mm by 20 mm. By contrast, the optical integrated circuit implemented in the embodiment under consideration can be made smaller to only about one-fourth of the size that has been required in the proposed composition.

As described on the foregoing pages, the present invention is based on the finding that the radiation loss which occurs in a waveguide varies with the radius of its curvature. Noting this fact, the present inventor deliberately caused radiation loss in waveguides by bending them with small radii of curvature and successfully attained a small distribution coefficient by virtue of the resulting radiation loss. This has enabled the present inventor to accomplish easy fabrication of a star coupler that is capable of distributing light at large ratio. In addition, the star coupler can be formed on a substrate of small area. Furthermore, the substrate need be coupled to optical fibers only at two end facets and, hence, the number of polished facets of the substrate is sufficiently reduced to simplify the fabrication process.

What is claimed is:

1. A star coupler comprising first, second and third waveguides, each of said second and third waveguides being curved so as to have a radius of curvature, said second and third waveguides branching from said first waveguide and said second waveguide having a different radius of curvature than said third waveguide.

2. A star coupler comprising first, second and third waveguides, each of said waveguides being curved so as to have a radius of curvature, said first waveguide having a first radius of curvature and connected to first and second terminals, and said second and third waveguides having a second radius of curvature greater than said first radius of curvature and connected respectively to said first terminal and a third terminal and to said second terminal and said third terminal.

3. A star coupler according to claim 2, comprising an optical circuit including said first, second and third terminals and said first, second and third waveguides, and wherein the third terminal of the optical circuit is connected to the first or second terminal of another optical circuit.

4. A star coupler comprising first, second, and third waveguides, each of said waveguides being curved so as to have a radius of curvature, said first waveguide having a first radius of curvature and connected to first and second terminals, and said second and third waveguides having a second radius of curvature greater than said first radius of curvature and connected respectively to said first terminal and a third terminal and to said second terminal and said third terminal, wherein said first, second and third waveguides are formed on a substrate, and said first and second terminals are connected to one end of said substrate and said third terminal is connected to another end of the substrate.

5. A star coupler comprising:

a substrate;

a first waveguide formed on said substrate, having a branching point;

a second waveguide formed on said substrate, having a first curvature portion branched from said first waveguide at the branching point; and a third waveguide formed on said substrate, having a second curvature portion branched from said first waveguide at the branching point, wherein the first curvature portion has a radius of curvature different from the second curvature portion.

6. The star coupler according to claim 5, wherein said second and third waveguides have branching ratios different from each other with respect to propagation light.

7. The star coupler according to claim 6, wherein said second or third waveguide has a radiation loss of propagation light occurred by the curvature portion, and wherein said branching ratio is set by said radiation loss.

8. The star coupler according to claim 5, wherein widths of said second and third waveguides are different from each other.

9. The star coupler according to claim 5, wherein said second and third waveguides are curved in a direction corresponding to a line extended from said first waveguide.

10. The star coupler according to claim 5, wherein said second and third waveguides are branched at an acute angle to each other from said first waveguide.

11. A star coupler comprising:

a substrate;

a first optical branching path provided on said substrate equally distributing received light;

second and third optical branching paths provided on the substrate, each of said second and third optical branching paths unequally distributing received light;

a first waveguide optically connecting said first optical branching path with said second and third optical branching paths, said first waveguide having a first radius of curvature; and a second waveguide optically connecting said second optical branching path with said third optical branching path, said second waveguide having a second radius of curvature, wherein the first radius of curvature is different from the second radius of curvature.

12. A waveguide circuit comprising:

a substrate;

a first waveguide formed on said substrate, having a branching point;

a second waveguide formed on said substrate, having a first curvature portion branched from said first waveguide at the branching point; and a third waveguide formed on said substrate, having a second curvature portion branched from said first waveguide at the branching point, wherein at least one of said second waveguide and third waveguide has a radiation loss of propagation light resulting from at least one of the first curvature portion and the second curvature portion, respectively, and wherein a branching ratio is set by said radiation loss, and wherein the first curvature portion has a radius of curvature different from the second curvature portion.

* * * * *